3,450,728
PROCESS FOR THE PRODUCTION OF COMPLEXES OF TRANSITION METALS WITH CYCLOOCTATETRAENE
Gunther Wilke and Heinz Breil, Mulheim (Ruhr), Germany, assignors to Studiengesellschaft Kohle m.b.H., Mulheim (Ruhr), Germany, a corporation of Germany
No Drawing. Filed Mar. 7, 1967, Ser. No. 621,115
Claims priority, application Germany, Mar. 9, 1966, St 25,089
Int. Cl. C07f 7/28, 15/06, 15/02
U.S. Cl. 260—429   17 Claims

ABSTRACT OF THE DISCLOSURE

Process of reducing transition metal complexes by reacting a dialkali metal cyclooctatetraene with a compound of a transition metal of Group IV–b, V–b, VI–b or the iron subgroup of Group VIII at about 20 to 200° C. with the exclusion of air and humidity to produce cyclooctatetraene transition metal complexes of the formula

wherein $m$ is 1, 2 or 3; $n$ is 1 or 2; and Me is vanadium, chromium, molybdenum, tungsten, or iron.

These products are useful as catalyst for the polymerization of ethylene and/or for the purification of the elemental metal portion of the complex.

---

This invention relates to a process for the production of complexes of transition metals with cyclooctatetraene.

German Patent 1,191,375 describes a process for the production of transition metal complexes. In this process, at least partially soluble transition metal compounds are reduced by means of organometallic compounds or metal hydrides or complex metal hydrides in the presence of compounds which act as electron donors. The transition metals obtained in reduced form are intercepted by the electron donors, and crystallized transition metal complexes may then be isolated in most cases. In the process described above, cyclic polyolefins and especially cyclooctatetraene may also be used as electron donors. The patent mentioned above describes the preparation of several transition metal-cyclooctatetraene complexes, e.g. of titanium, nickel and of other transition metals, in which no ligands other than cyclooctatetraene are attached to the transition metal.

It has now been found unexpectedly that such complexes of transition metals with cyclooctatetraene can also be prepared by a different method which may be much more economical under certain circumstances. It is long known that cyclooctatetraene reacts with alkali metals and is thereby converted into dialkali metal compounds. According to W. Reppe, these dialkali metal compounds of cyclooctatetraene have been described as 1,4-adducts of two alkali metal atoms at each cyclooctatetraene molecule. It was not before 1960 that Th. Katz could furnish evidence that the dialkali metal compounds of cyclooctatetraene are based on a fully symmetrized cyclooctatetraene dianion with a quasiaromatic 10-$\pi$ electron system. In accordance with the invention, these dialkali metal compounds of cyclooctatetraene can be reacted very smoothly with transition metal compounds, e.g. transition metal halides, in the sense of a double reaction. This results in the formation of alkali metal salts, e.g. alkali metal halides, in addition to the cyclooctatetraene complexes of the transition metals. The reaction must not only proceed as a double reaction, but it is also possible by means of the dialkali metal cyclooctatetraenes to effect a reduction of the transition metals in which free cyclooctatetraene which is not combined by the transition metal is formed in addition to alkali metal halide.

The process of the invention comprises reacting dialkali metal compounds of cyclooctatetraene with compounds of transition metals of Groups IV, V, VI, and VIII of the Periodic Table at temperatures of from 20 to 200° C. Transition metals of Groups IV, V, VI and VIII are understood to be those which are listed in the Periodic Table of the Commission on Atomic Weights and International Union of Pure and Applied Chemistry under Groups IV–B, V–B, VI–B, and VIII. Examples of these transition metals include titanium, zirconium, vanadium, chromium, molybdenum, tungsten, iron, cobalt, and nickel.

Preferred as dialkali metal compounds of cyclooctatetraene are the sodium and potassium compounds. However, compounds of lithium may also be used.

The compounds of the transition metals are preferably used in the form of their halides. However, other compounds, e.g. the acetyl acetonates, may also be used.

The alkali metal compounds of cyclooctatetraene used as the starting materials can be prepared by known processes by reacting alkali metals which are as finely divided as possible and cyclooctatetraene, e.g. in ethers. It is particularly advantageous to add to the reaction mixture aromatic hydrocarbons, e.g. naphthalene or diphenyl as well as other aromatics which then act as alkali metal transfer agent because they react themselves primarily with the alkali metals. The dialkali metal compounds of cyclooctatetraene are extremely reactive organometallic compounds which react instantaneously with, for example, compounds having mobile hydrogen, e.g. H-acid compounds with protonolysis and are inflamed instantaneously in the air. Therefore, all operations must be carried out with absolute exclusion of air and humidity.

The reaction with the transition metal compounds is preferably carried out in solvents in which especially the dialkali metal cyclooctatetraenes are soluble. Particularly suitable are aromatic hydrocarbons and cyclooctatetraene itself and ethers, tetrahydrofuran, dioxane and generally dialkyl, diaryl or aralkyl ethers as well as cyclic ethers. It is also possible, however, to carry out the reaction in the presence of aliphatic hydrocarbons in which the reactants are insoluble or only very sparingly soluble, but care must be taken in this case for very intensive stirring or grinding.

Reaction temperatures of from 20 to 200° C. may be used, preferred being 20 to 100° C. The products obtained in the process of the invention have generally rather high thermal stability but are highly reactive with H-acid compounds and oxygen.

The transition metal complexes obtainable by the present process are generally isolated by extraction with aromatic hydrocarbons in which the alkali metal compounds produced, e.g. alkali metal halides, are insoluble but in which the process products are soluble. In most cases, continuous extraction at elevated temperatures is recommendable because the solubility of the process products at room temperature is normally poor. However, this is an advantage for the recovery because the reaction products are obtained immediately in crystalline form in the extract.

The composition of the cyclooctatetraene complexes of the transition metals obtainable in accordance with the invention varies, the following types being obtained:

$Me_2(COT)_3$, $Me(COT)_2$, $Me(COT)+$

They are important starting products for further reactions but have also particular activity as catalysts, e.g.

for the polymerization of ethylene. Moreover, they may be used for the recovery of elemental metals, e.g. by thermal decomposition of the process products. +COT stands for cyclooctatetraene.

Example 1

Disodium cyclooctatetraene is first prepared by known methods (e.g. W. Reppe, Liebigs Ann.d.Ch. 560, 1 (1948); Th. Katz, J. Am. Chem. Soc., 82, 3784 (1960)) by allowing 115 g. of cyclooctatetraene to drop into a finely disperse suspension of 46 g. of sodium in 1 liter of absolute ether and distilling off the ether and excess cyclooctatetraene upon completion of the reaction.

A solution of 2.3 g. of $TiCl_4$ in 75 ml. of benzene is allowed to drop under an inert gas atmosphere into a suspension of 3.6 g. of disodium cyclooctatetraene in 150 ml. of absolute benzene while stirring and stirring is continued for 2 days at 70° C. The reaction mixture is then transferred with additional 400 ml. of benzene into an extraction thimble and extracted. The resultant solution from which black-violet crystals have already precipitated is concentrated to dryness and the residue is recrystallized from benzene or toluene to give 1.6 g. of violet-black, air-sensitive crystals of titanium dicyclooctatetraene, the yield corresponding to 52% of the theoretical.

*Analysis.*—Calculated for titanium dicyclooctatetraene $Ti(COT)_2$: Ti, 18.7%; C, 75.0%; H, 6.3%. Found: Ti, 18.6%; C, 74.8%; H, 6.3%.

Example 2

25.5 grams of disodium cyclooctatetraene and 16.1 g. of vanadium trichloride are ground for 40 hours at room temperature under an inert gas atmosphere in a glass ball mill (described by H. Clasen, Angew. Chem., 73, 325 (1961). The reaction mixture is subsequently transferred with additional 400 ml. of toluene into an extraction thimble and extracted at about 90° C. and slightly reduced pressure. Upon completion of the extraction, the extraction solution is concentrated to dryness and the residue is recrystallized from toluene. There are obtained 5.4 g. of black bright crystals of a mixture of divanadium tricyclooctatetraene and vanadium dicyclooctatetraene, the yield corresponding to 23% of the theoretical.

*Analysis.*—Calculated for $V(COT)_2$: V, 19.65; C, 74.13; H, 6.22. Calculated for $V_2(COT)_3$: V, 24.59; C, 69.57; H, 5.84. Found: V, 22.0; C, 71.9; H, 5.8.

Example 3

Dipotassium cyclooctatetraene is prepared by allowing 52 g. of cyclooctatetraene to drop into a mixture of 200 ml. of tetrahydrofuran, 800 ml. of benzene, 25 g. of naphthalene and 39 g. of finely cut potassium while stirring at room temperature under an inert gas atmosphere. The reaction is completed after about 12 hours. The precipitated dipotassium cyclooctatetraene is separated by filtration, washed three times with 50 to 100 ml. of benzene and freed from solvent adhering thereto under a vacuum of $10^{-3}$ mm. Hg. Disodium cyclooctatetraene can be prepared in an analogous manner just as conveniently.

A sample of 21.1 g. of the dipotassium cyclooctatetraene, 10.2 g. of vanadium trichloride and 150 ml. of toluene are ground in a ball mill and subsequently processed in the manner described in Example 2 to give 4.4 g. of black bright crystals consisting of a mixture of divanadium tricyclooctatetraene and vanadium dicyclooctatetraene, the yield corresponding to 30% of the theoretical.

*Analysis.*—Found, 22.2% V, 71.3% C, 5.6% H.

Example 4

The procedure described in Example 2 is followed except that 21.1 g. of dipotassium cyclooctatetraene and 10.8 g. of chromium trichloride are used in 150 ml. of toluene as the solvent to give 4.45 g. of black crystals consisting of dichromium tricyclooctatetraene, the yield being 31.5% of the theoretical.

*Analysis.*—Calculated for $Cr_2(COT)_3$: Cr, 24.97%; C, 69.22%; H, 5.81%. Found: Cr, 24.85%; C, 69.4%; H, 5.8%.

Example 5

The procedure described in Example 2 is followed except that 25.7 g. of disodium cyclooctatetraene, 16.2 g. of chromium trichloride are used to give 3.5 g. of dichromium tricyclooctatetraene, the yield being 16.5% of the theoretical.

*Analysis.*—Found, 24.7% Cr, 69.2% C, 5.8% H.

Example 6

The procedure described in Example 2 is followed except that 33.8 g. of disodium cyclooctatetraene, 23.8 g. of chromium trichloride and 150 ml. of benzene as the solvent in place of toluene are used to give 4.4 g. of dichromium tricyclooctatetraene, the yield corresponding to 14.1% of the theoretical.

*Analysis.*—Found, 24.7% Cr, 69.0% C, 5.8% H.

Example 7

A solution of 4.7 g. of dipotassium cyclooctatetraene in 125 ml. of tetrahydrofuran is added dropwise within 1 hour while stirring to 6.4 g. of $CrCl_3 \cdot 3THF$ dissolved in 400 ml. of tetrahydrofuran. Stirring is continued for 4 hours at room temperature. Then the tetrahydrofuran is removed under vacuum, the residue is dissolved in 150 ml. of toluene, the solution is subjected to suction filtration through a frit at 80° C. and cooled to −20° C. Then the precipitated crystals are separated by suction filtration at −20° C. After drying, 0.8 g. of dichromium tricyclooctatetraene are obtained, the yield corresponding to 22.5% of the theoretical.

*Analysis.*—Found, 24.5% Cr, 69.1% C, 5.7% H.

Example 8

The procedure described in Example 2 is followed except that 10.0 g. of molybdenum pentachloride and 20.0 g. of dipotassium cyclooctatetraene are used in 150 ml. of toluene. After recrystallization, 1.9 g. of green-black fine crystals consisting of dimolybdenum tricyclooctatetraene are obtained, the yield corresponding to 20.6% of the theoretical.

*Analysis.*—Calculated for $Mo_2(COT)_3$: Mo, 38.05%; C, 57.15%; H, 4.80%. Found: Mo, 37.9%; C, 57.1%; H, 4.8%.

Example 9

The procedure described in Example 2 is followed except that 5.8 g. of tungsten pentabromide and 7.6 g. of disodium cyclooctatetraene are used in 150 ml. of toluene to give finally 0.45 g. of black crystals consisting of ditungsten tricyclooctatetraene, the yield corresponding to 13.3% of the theoretical.

*Analysis.*—Calculated for $W_2(COT)_3$: W, 54.06%; C, 42.38%; H, 3.56%. Found: W, 54.0%; C, 41.2%; H, 3.1%.

Example 10

Example 2 is repeated except that 26.1 g. of disodium cyclooctatetraene, 17.1 g. of iron trichloride (sublimed) are used to give 2.1 g. of black bright crystals consisting of iron cyclooctatetraene, the yield corresponding to 12.4% of the theoretical.

*Analysis.*—Calculated for $Fe(COT)$: Fe, 34.91%; C, 60.05%; H, 5.04%. Found: Fe, 35.3%; C, 58.9%; H, 5.0%.

Example 11

Example 2 is repeated except that 22.8 g. of disodium cyclooctatetraene and 14.65 g. of iron trichloride (sublimed) are used in 120 ml. of cyclooctatetraene as the solvent in place of toluene to give 4.85 g. of iron cyclooctatetraene corresponding to 25.5% of the theory.

*Analysis.*—Found, 34.9% Fe, 59.2% C, 5.0% H.

Example 12

The procedure of Example 2 is followed except that 22.8 g. of disodium cyclooctatetraene and 17.05 g. of anhydrous nickel dichloride are used to give 6.2 g. of black bright crystals consisting of nickel cyclooctatetraene corresponding to 25% of the theory.

*Analysis.*—Calculated for Ni(COT): Ni, 36.05%; C, 59.0%; H, 4.95%. Found: Ni, 36.1%; C, 58.6%; H, 4.9%.

Example 13

Example 2 is repeated except that 5.5 g. of dipotassium cyclooctatetraene, 7.7 g. of nickel (II) acetyl acetonate and 120 ml. of toluene and 30 ml. of cyclooctatetraene as the solvent are used to give 1.15 g. of nickel cyclooctatetraene corresponding to a yield of 23.5%.

*Analysis.*—Found, 35.6% Ni, 58.6% C, 4.8% H.

Example 14

The procedure of Example 2 is followed except that 23.8 g. of dipotassium cyclooctatetraene, 10.1 g. of cobalt dichloride are used to give 2.0 g. of black, very fine crystals consisting of cobalt cyclooctatetraene corresponding to a yield of 16%.

*Analysis.*—Calculated for Co(COT): Co, 36.14%; C, 58.92%; H, 4.94%. Found: Co, 36.2%; C, 58.4%; H, 5.0%.

An increase in the yield can be achieved by adding to a suspension of the compounds of the transition metals slowly while stirring and dropwise a suspension of the dialkali metal cyclooctatetraene in a glass ball mill. This is illustrated by the following examples.

Example 15

In a ball mill filled with glass balls, 13.9 g. of chromium trichloride are finely ground with 70 ml. of toluene. A fine suspension of 21.9 g. of disodium cyclooctatetraene in 80 ml. of toluene is slowly added dropwise while stirring to this mixture. After the addition is completed, stirring is continued for further 24 hours. The reaction mixture is transferred with additional 400 ml. of toluene into an extraction sleeve and extracted at about 80° C. under a slightly reduced pressure. Upon completion of the extraction, the solution is concentrated to dryness and the residue recrystallized from toluene to give 6.6 g. of black crystals consisting of dichromium-tri-cyclooctatetraene (yield, 36%).

*Analysis.*—Found, 24.9% Cr, 69.0% C, 5.7% H.

Example 16

Example 15 is repeated except that 50.5 g. of tungsten pentabromide and 30.5 g. of disodium cyclooctatetraene are used to give 11.2 g. of ditungsten-tri-cyclooctatetraene (yield, 38%).

*Analysis.*—Found, 54.2% W, 42.1% C, 3.4% H.

Example 17

Example 15 is repeated except that 18.5 g. of iron trichloride and 26.0 g. of disodium cyclooctatetraene are used to give 5.8 g. of iron cyclooctatetraene (yield, 32%).

*Analysis.*—Found, 34.8% Fe, 60.1% C, 4.9% H.

Example 18

Example 15 is repeated except that 17.0 g. of cobalt dichloride and 20.6 g. of disodium cyclooctatetraene are used to give 6.6 g. of cobalt cyclooctatetraene (yield, 31%).

*Analysis.*—Found, 36.0% Co, 59.0% C, 4.7% H.

What we claim is:

1. Process for preparing of complexes of transition metals with cyclooctatetraene which comprises reacting dialkali metal compounds of cyclooctatetraene with compounds of transition metals of Groups IV–B, V–B, VI–B and the iron subgroup of Group VIII of the Periodic System at temperatures of about 20 to 200° C. under exclusion of air and humidity.

2. Process according to claim 1, wherein the transition metals are titanium, vanadium, chromium, molybdenum, tungsten, iron, cobalt or nickel.

3. Process according to claim 1, wherein the alkali metals are lithium, sodium or potassium.

4. Process according to claim 2, wherein the starting compounds of transition metals are chloride, bromide, iodide or acetyl acetonate.

5. Process according to claim 1 which comprises carrying out the reaction at temperatures of about 20 to 100° C.

6. Process according to claim 1, wherein the reaction is carried out in a solvent.

7. Process according to claim 6, wherein the solvents are aromatic hydrocarbons, cyclooctatetraene, acyclic or cyclic ethers.

8. Process according to claim 1 which comprises adding dropwise a suspension of the dialkali metal cyclooctatetraene to a suspension of the compounds of the transition metals while stirring in a glass ball mill.

9. Process according to claim 1, wherein the complexes of transition metals with cyclooctatetraene are isolated by extraction.

10. Process according to claim 1, wherein the complexes of the transition metals with cyclooctatetraene have the formulae:

$$Me(COT), Me(COT)_2, Me_2(COT)_3$$

wherein COT stands for cyclooctatetraene.

11. Cyclooctatetraene-transition metal complexes of the formula

wherein $m$ is 2 or 3; $n$ is 1 when $m$ is 2 and $n$ is 2 when $m$ is 3; and Me is vanadium, chromium, molybdenum or tungsten.

12. Complex as claimed in claim 11, wherein Me is vanadium, $n$ is 1 and $m$ is 2.

13. Complex as claimed in claim 11, wherein Me is vanadium, $n$ is 2 and $m$ is 3.

14. Complex as claimed in claim 11, wherein Me is chromium, $n$ is 2 and $m$ is 3.

15. Complex as claimed in claim 11, wherein Me is molybdenum, $n$ is 2 and $m$ is 3.

16. Complex as claimed in claim 11, wherein Me is tungsten, $n$ is 2 and $m$ is 3.

17. Cyclooctatetraene-transition metal complexes of the formula

References Cited

UNITED STATES PATENTS 3,068,258  12/1962  Pruett et al. _____ 260—429
3,297,756   1/1967  Benson et al. _____ 260—567.6

OTHER REFERENCES

Fischer et al.: Angew. Chem., International Edition 2 (1963), p. 92.

TOBIAS E. LEVOW, *Primary Examiner.*

A. P. DEMERS, *Assistant Examiner.*

U.S. Cl. X.R.

75—.5; 252—431; 260—94.9, 429.3, 429.5, 438.5, 439, 665